Nov. 15, 1932.   B. F. CONNER ET AL   1,887,993
MOLDING APPARATUS AND METHOD OF MOLDING FOR INTERIORLY THREADED ARTICLES
Filed March 6, 1929   2 Sheets-Sheet 1
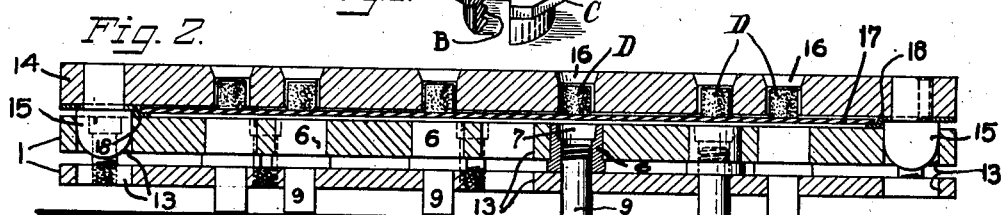
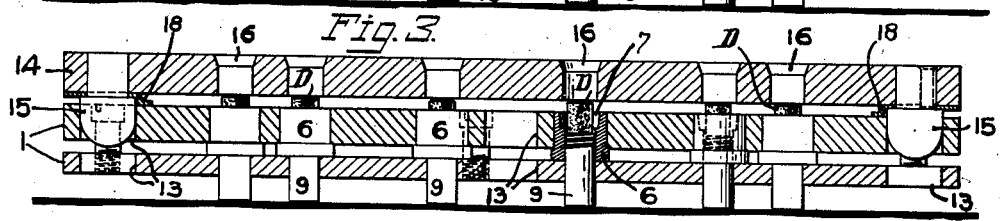
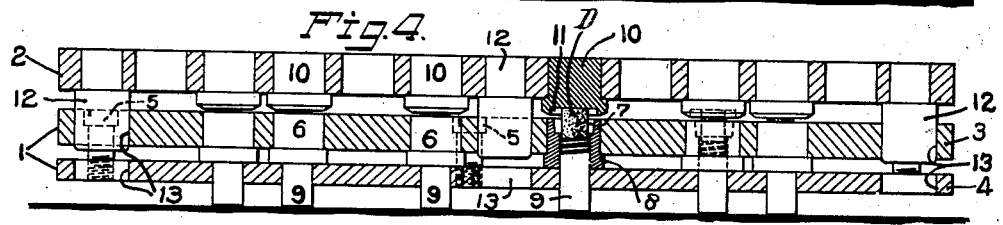
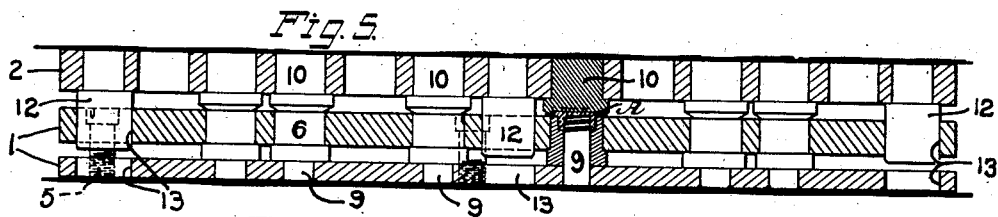
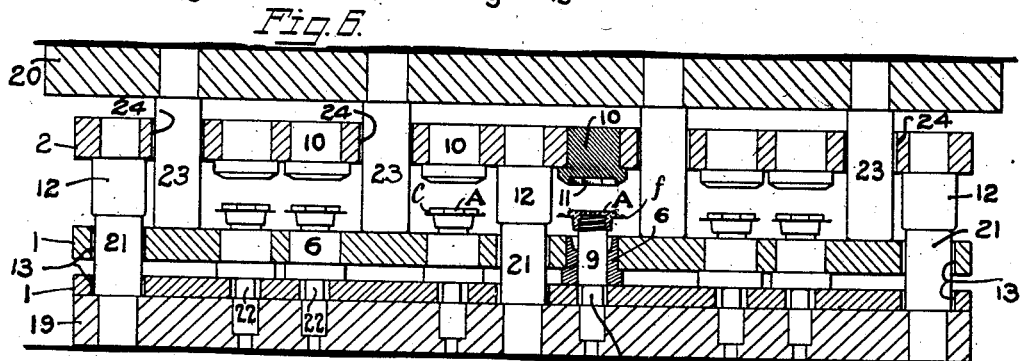
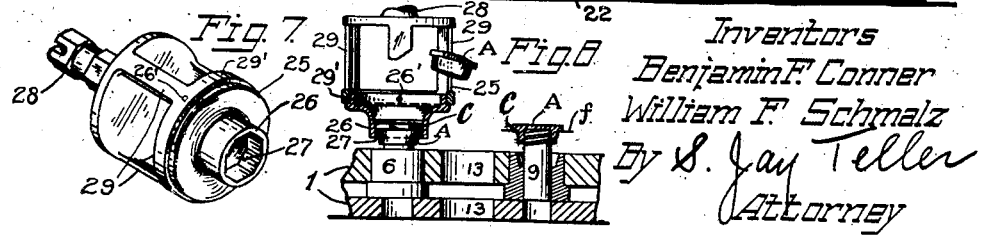
Inventors
Benjamin F. Conner
William F. Schmalz
By S. Jay Teller
Attorney Nov. 15, 1932.  B. F. CONNER ET AL  1,887,993
MOLDING APPARATUS AND METHOD OF MOLDING FOR INTERIORLY THREADED ARTICLES
Filed March 6, 1929  2 Sheets-Sheet 2
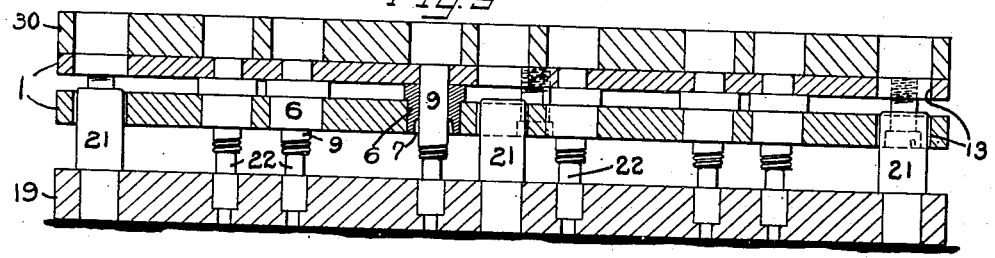
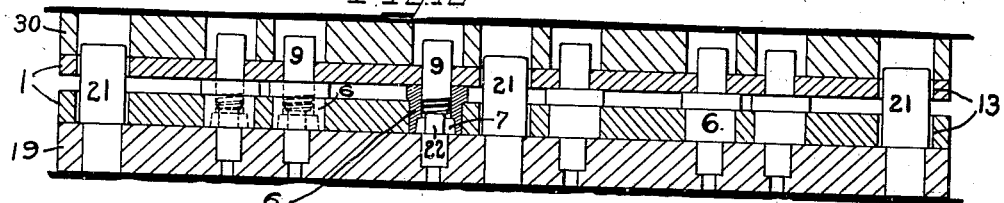
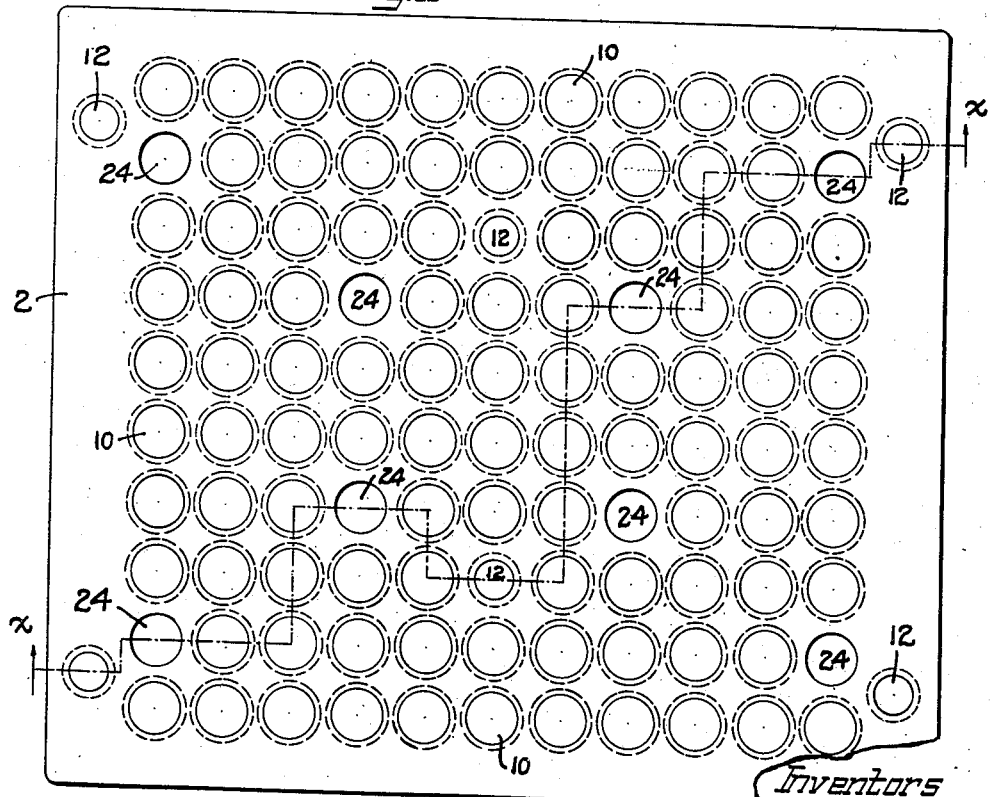
Inventors
Benjamin F. Conner
William F. Schmalz
By S. Jay Teller
Attorney Patented Nov. 15, 1932

1,887,993

UNITED STATES PATENT OFFICE

BENJAMIN F. CONNER, OF HARTFORD, AND WILLIAM F. SCHMALZ, OF ROCKVILLE, CONNECTICUT, ASSIGNORS TO COLT'S PATENT FIRE ARMS MANUFACTURING CO., OF HARTFORD, CONNECTICUT, A CORPORATION OF CONNECTICUT

MOLDING APPARATUS AND METHOD OF MOLDING FOR INTERIORLY THREADED ARTICLES

Application filed March 6, 1929. Serial No. 344,746.

The invention is particularly adapted for the molding of objects or articles such as the interiorly threaded caps which are used on collapsible tubes containing pharmaceutical and toilet preparations, but it will be understood that the invention is not necessarily limited to the molding of articles of this particular character or intended for this particular purpose. Our invention is not necessarily limited as concerns the material to be molded, but it may be regarded as particularly adapted for use in molding phenolic condensation compounds.

The general object of the invention is to provide a molding apparatus and a method of molding for articles of the character described which make it possible to mold such articles in large quantities at a minimum cost. This general object is attained by reason of various details of construction of the apparatus, and by reason of certain novel method steps. A particularly important feature is the adaptation of the mold for the convenient ejecting of the completed objects out of the mold recesses. This ejection makes it more convenient for the completed articles to be unscrewed from the threaded core pins on which they are formed, and it further facilitates the removal of the overflow or flash, this ordinarily being accomplished by the same tool that does the unscrewing.

Other objects of the invention will be apparent from the following specification and claims.

In the accompanying drawings we have shown one embodiment of the invention but it will be understood that the drawings are intended for illustrative purposes only and are not to be construed as defining or limiting the scope of the invention, the claims forming a part of this specification being relied upon for that purpose.

Of the drawings:

Fig. 1 is a perspective view of a tube cap of the type adapted to be molded in accordance with the invention, a portion being broken away to show the interior cross section.

Figs. 2 to 6 are transverse sectional views of the mold and of the auxiliary parts adapted to be used therewith, these views showing successive steps in the molding operation. Each of these views is taken along the line X—X of Fig. 11.

Fig. 7 is a fragmentary perspective view of a tool for removing the flash and for unscrewing the completed molded bodies.

Fig. 8 is a fragmentary transverse sectional view showing the action of the tool shown in Fig. 7.

Figs. 9 and 10 are views showing the restoration of the core pins to their initial positions so as to adapt the mold for the next following mold operation.

Fig. 11 is a plan view of the mold proper as shown for instance in Fig. 4.

Fig. 1 shows a tube cap A of the type for the molding of which the invention is particularly adapted. It will be noted that the cap A is closed at its upper end and is open at the other end, and that it is provided adjacent the open end with interior threads B adapted to engage the exterior threads at the end of the tube. Preferably the cap has a peripheral flange C adjacent the top face which facilitates the screwing and unscrewing of the cap onto and from the threaded neck of the tube. It will, of course, be understood that the invention is in no way limited as concerns the details of size and shape of the cap.

Fig. 4 shows the mold proper without auxiliary parts, this comprising two main separable sections 1 and 2. For convenience the sections 1 and 2 will be referred to as lower and upper sections respectively, but the invention is not necessarily so limited. We have shown a multiple mold adapted for the simultaneous molding of a plurality of similar tube caps and throughout the specification we will refer to multiple molding, but it will be understood that as concerns the broader aspects of the invention there is no limitation as concerns the number of tube caps which are molded at one time.

The two mold sections 1 and 2 are so formed that they serve, when in operative relationship, to provide a plurality of mold recesses shaped to determine the exterior contours of the tube caps or other articles to be molded. As shown the mold sections are constructed so that the tube caps are molded in upright positions with their closed ends at the top. The lower section 1 is shaped to determine a part of the exterior contour of the cap adjacent the lower open end thereof; and the upper section 2 has a recess shaped to determine the exterior contour of the said article at the closed end thereof and at least in part at the sides thereof. When the cap is provided with a peripheral flange C adjacent the top as is here shown, the exterior contour of the lower part of the cap below the flange is preferably determined by the lower mold section 1, and the exterior contour of the cap at the top and at the periphery of the flange is preferably determined by the recess in the upper mold section 2. For the sake of convenience of construction the lower section 1 is formed with two separate plates 3 and 4 suitably connected by means of screws 5, 5. Seated in apertures in the upper plate 3 are plugs 6, 6 each formed with a recess 7 therein forming a part of the corresponding mold recess and being shaped to determine the exterior contour of the lower part of the tube cap. The said exterior contours are such as to permit upward withdrawal of the completed caps from the recesses while all of the parts of the lower section remain in fixed relation to each other. Each of the plugs 6 is provided with an enlarged bottom portion 8 which forms an upper shoulder determining the position of the plug with respect to the plate 3. The lower ends of the plugs are engaged by the plates 4 and the screws 5, 5 serve to clamp the plugs in place.

For each mold recess the lower mold section is provided with an exteriorly threaded core pin 9 shaped to determine the threaded interior contour of the cap. Each of the plugs 6 is provided with a central vertical hole extending into the mold recess 7 thereof and the plate 4 is provided with corresponding holes registering with the respective holes in the plugs. Positioned in the said holes in the plugs 6 and in the plate 4 are the said core pins 9 which are shaped as already described. The pins 9 are preferably longitudinally movable in their respective holes and preferably the said pins are initially positioned as shown in Fig. 4 so as not to project into the mold recesses. Preferably and as shown the holes in the plugs extend to the lower face of the mold and the core pins 9 initially project at their lower ends. Initially the several pins serve to support the entire mold as shown.

The upper mold section 2 is provided with plugs 10, 10 corresponding in number and in location to the plugs 6, 6 in the lower mold section 1. These plugs 10 are formed with mold recesses 11 adapted to determine the upper portion of the exterior contour of the tube caps to be molded. In order that the two mold sections 1 and 2 may be held in proper register with each other the said upper section 2 is provided with dowel pins 12, 12 which project into holes 13, 13 in the lower section 1.

The moldable material is preferably formed into pellets or briquettes so that suitably measured quantities of the said material may be conveniently available for loading into the several mold recesses. We do not limit ourselves as concerns the method of loading or filling the said recesses but a convenient fixture for this purpose is shown in Figs. 2 and 3. Referring first to Fig. 2 it will be observed that there is shown the lower mold section 1 as already described in detail in conjunction with Fig. 4 and that there is also shown a loading fixture having a main body or plate 14. The plate 14 is provided with dowel pins 15, 15 adapted to enter the said holes 13, 13 in the lower mold section 1 to properly hold the fixture in position. The plate 14 is provided with a plurality of holes 16, 16 which are in register with the several mold recesses 7 in the plugs 6. The fixture comprises in addition to the plate 14 a sheet metal slide 17 which is normally held in position with respect to the plate 14 by means of guides 18, 18. The slide 17 when in position as shown in Fig. 2 serves to close the lower ends of the holes 16, 16 but the said slide may be moved horizontally in the guides 18, 18 so as to leave the lower ends of the holes 16, 16 open as shown in Fig. 3. In loading, pellets or briquettes D, D of suitable size and of the required material are placed in the several holes 16, 16 in the plate 14, these briquettes being initially supported by the plate 17. Then with the fixture in place on the lower mold section 1 as shown in Fig. 2 the slide 17 is withdrawn allowing the briquettes D, D to drop into the mold recesses 7, 7 as clearly shown in Fig. 3. Then the loading fixture is removed and the molding proceeds as will now be described.

When the briquettes D, D have been put in place in the recesses of the lower mold section, either by means of the loading fixture as already described or otherwise, the upper mold section 2 is put in place as shown in Fig. 4. The two mold sections 1 and 2 initially assume substantially their closed relationship although they may be held slightly separated as shown by reason of their engagement with the briquettes D, D. As already stated the core pins 9, 9 project at the bottom and these may serve to initially support the entire mold.

The mold is then placed in a heated press of any usual or preferred type having a lower bed plate and an upper platen, and pressure is applied in the usual way as indicated in Fig. 5. This pressure serves not only to firmly engage the two main mold sections 1 and 2 with each other but it also serves to move the core pins 9, 9 longitudinally into the mold recesses 7, 11 thus forming and determining the interior contours of the caps which are being molded. It will be understood that, with the particular construction disclosed, the movement of the pins 9, 9 into the mold recesses constitutes the final closing of the mold. The pins 9, 9 in moving into the mold recesses accomplish two results, one being the determination of the interior contour as already mentioned and the other being the application to the plastic material of the pressure which is required for proper molding. As already pointed out the main mold sections are initially substantially in engagement with each other and they would not of themselves apply any pressure to the moldable material. This required pressure is obtained entirely by the entry of the core pins into the mold recess. The mold parts are allowed to remain in their molding positions for the time which is required for the proper curing of the molded material.

After the conclusion of the molding and curing operation the mold proper is assembled with two auxiliary plates 19 and 20 which are shown in Fig. 6. The lower plate 19 has upward projecting pins 21, 21 adapted to enter the holes 13, 13 in the lower mold section 1 and it preferably also has a plurality of pins 22, 22 adapted to engage the lower ends of the several core pins 9, 9. The upper auxiliary plate 20 has downward projecting pins 23, 23 which are positioned to extend through holes 24, 24 in the upper mold section 2. The closed mold is placed on the lower auxiliary plate 19 with the pins 21, 21 extending into the holes 13, 13 and engaging the lower ends of the dowel pins 12, 12, and with the pins 22, 22 vertically below the core pins 9, 9. The upper auxiliary plate 20 is put in place with the pins 23, 23 entering the holes 24, 24 and engaging at their lower ends with the top surface of the bottom mold section 1. The entire assemblage is placed in a press and pressure is applied with the result that the parts are moved to the relative positions shown in Fig. 6. The pins 21, 21 engage the pins 12, 12 to push the upper mold section 2 upward and at the same time the pins 23, 23 engage the lower mold section 1 to push it downward. This relative downward movement of the lower mold section 1 causes the core pins 9, 9 to be moved additionally in the relatively upward direction by reason of their engagement with the pins 22, 22 on the plate 19.

The operation that has been described serves to withdraw the upper mold section 2 from the lower mold section 1, and this withdrawal in and of itself serves to expose the upper portions of the caps, that is, the flanged portions C thereof which are located above the lower section 1. Such exposure of the upper portions of the caps makes it possible for the caps to be turned with respect to the mold and thereby unscrewed from the threaded core pins 9, 9.

When the pins 22, 22 are provided, as preferred, for additionally moving the core pins 9, 9, the said core pins assume the relative positions shown in Fig. 6 with the result that the finished tube caps A, A are ejected from their initial positions, that is, their initial positions in the lower mold recesses, but remain in place on the upper ends of the core pins. It will be observed that the ejection of the caps A, A separates the overflows or flashes f, f thereof from both mold sections as clearly shown.

After the parts have been moved to the relative positions shown in Fig. 6 the upper auxiliary plate 20 and the upper mold section 2 are removed, and, as indicated in Fig. 8, the lower mold section 1 may be placed on a suitable table or support for the more ready removal of the caps A, A which are now held solely by the core pins 9. For convenience the bottom mold section 1 may be placed in an inclined position, although it is not so shown. The caps can be readily unscrewed from the core pins, this being done either by hand or by some suitable rotatable tool.

Preferably we make use of a rotatable tool, which serves not only to unscrew the finished molded caps A, A from the core pins, but which also serves to break off and remove the overflows or flashes f, f therefrom. One form of tool 25 is shown in Fig. 7, this tool having a head 26 with an opening 27 therein of such size and shape as to enable the head to closely fit over the exterior portion of the molded cap. It will be understood that the tool 25 or at least the head portion thereof must be constructed to fit the particular size and style of cap or other article which is being molded. Preferably the tool 25 is open at the outer side of the head 26 so as to permit the completed articles to pass entirely through the head and to be discharged at the outer side thereof. As shown there is provided a stem 28 which is connected with the head by means of spaced spider arms 29, the spaces between the arms being of sufficient size to permit the completed molded articles to pass through. The tool as shown in Fig. 7 may be provided with a handle whereby it may be turned manually, or it may be connected with a suitable pneumatic electric or other power rotating means. For convenience in changing the head 26 to fit different caps, there is provided a ring 29' formed integrally with the arms 29 and the head 26 is detachably connected with the ring by means of pins 26'.

In operation the tool 25 is placed over the completed molded body or cap A as shown at the left in Fig. 8. Inasmuch as the hole in the head is of approximately the same size and shape as the exterior contour of the cap, the head serves to break off and remove the flash so that very little if any subsequent cleaning of the cap is required. When the tool 25 is connected with a power means, as is preferred, it is continuously rotating and the unscrewing of the cap A takes place substantially simultaneously with the removal of the flash. Inasmuch as tube caps and the like ordinarily have but two or three threads, the unscrewing is effected almost instantaneously and the rotating tool 25 can be quickly transferred from one cap to another so that all of the caps made in a multiple mold can be very quickly cleaned and unscrewed. By reason of the fact that the tool 25 is open at the outer side of the head 26, the caps A, A, as they are successively cleaned and unscrewed, can pass through the head 26 and then outward between the arms 29 of the spider into a suitable receptacle (not shown) placed to receive them.

The herein-described tool 25 is not herein claimed as a part of the present invention, this tool constituting the subject matter of our copending application for "Tool for removing threaded articles from a mold", Serial No. 553,570 filed July 28, 1931.

In order to restore the core pins to their initial positions, with respect to the lower mold section 1, use is again made of the auxiliary plate 19. The positions of the lower mold section 1 and the auxiliary plate 19 are relatively reversed. The result may be obtained by reversing the mold section 1 as shown in Fig. 9, this section being again placed on the auxiliary plate 19 with the pins 21, 21 entering the holes 13, 13 as shown. It will be observed that the pins 22, 22 now engage the opposite ends of the core pins 9, 9, that is, they engage the ends thereof which are normally the upper ends. An auxiliary plate 30 is put in place on the lower mold section 1 as shown in Fig. 9, this plate having holes therein which provide clearances for the core pins 9, 9 and for the pins 21, 21. The entire assemblage as shown in Fig. 9 is placed in a press and pressure is applied so as to move the parts to the relative positions shown in Fig. 10. It will be seen that the core pins 9, 9 are moved so that they no longer project into the core recesses 7, their relationship to the mold section 1; 1 being exactly that already shown in Fig. 4. The mold section 1, 1 can now be removed and again reversed so as to assume its normal position and the molding process as already described can be repeated.

What we claim is:

1. The hereindescribed method of molding an article having an opening therein, which comprises placing a suitable quantity of moldable material in a mold recess shaped to determine the exterior contour of the article to be molded, retaining the recess forming sections of the mold in fixed operative relationship to each other during molding, while the said sections are so retained moving into the said recess a core pin which serves to apply molding pressure to the moldable material in the recess and also serves to determine the interior contour of the opening in the molded article, and upon the opening of the mold recess additionally moving the core in the same direction as before and beyond its normal molding position so as to move the completed molded article from its initial position to a more accessible position.

2. The hereindescribed method of molding an interiorly threaded article, which comprises placing a suitable quantity of moldable material in a mold recess shaped to determine the exterior contour of the article to be molded, retaining the recess forming sections of the mold in fixed operative relationship to each other during molding, while the said sections are so retained moving into the recess and into the said moldable material therein an exteriorly threaded core pin which serves to apply molding pressure to the moldable material and also to determine the threaded interior contour of the molded article. upon the opening of the mold recess additionally moving the core pin in the same direction as before and beyond its normal molding position so as to move the completed molded article from its initial position to a more accessible position, and finally unscrewing the molded article from the threaded pin.

3. In a mold for an interiorly threaded article, the combination of two separable companion mold sections serving when in operative relationship to provide a mold recess shaped to determine the exterior contour of the article to be molded, one of the said sections having a hole terminating at its inner end at the said mold recess, and an exteriorly threaded core pin positioned in part in the said hole and projecting into the mold recess to determine the threaded interior contour of the article to be molded, the said core pin after the mold sections have been separated being relatively movable in the direction in which it projects and beyond its normal molding position so as to move the completed molded article from its initial position to a more accessible position in order that it may be conveniently unscrewed from the pin.

4. In a mold for an article having an opening therein, the combination of two separable companion mold sections serving when in operative relationship to provide a mold recess shaped to determine the exterior contour of the article to be molded, one of the said sections having a hole terminating at its inner end at the said mold recess, and a core pin in the hole longitudinally movable into the mold recess while the mold sections are in operative relationship and serving upon such movement to apply molding pressure to moldable material in the recess and also to determine the interior contour of the opening in the resultant molded article, the said core pin being additionally movable longitudinally in the same direction as before after the mold sections have been separated so as to eject the completed molded article from the mold recess.

5. In a mold for an interiorly threaded article, the combination of two separable companion mold sections serving when in operative relationship to provide a mold recess shaped to determine the exterior contour of the article to be molded, one of the said sections having a hole terminating at its inner end at the said mold recess, and an exteriorly threaded core pin in the hole longitudinally movable into the mold recess while the mold sections are in operative relationship and serving upon such movement to apply molding pressure to moldable material in the recess and also to determine the threaded interior contour of the article to be molded, the said core pin after the mold sections have been separated being relatively movable in the direction in which it projects and beyond its normal molding position so as to move the completed molded article from its initial position to a more accessible position in order that it may be conveniently unscrewed from the pin.

6. In a mold for a plurality of similar articles having openings therein, the combination of two separable mold sections serving when in operative relationship to provide a plurality of closed mold recesses adapted to determine the exterior contours of the articles to be molded, the said sections respectively having top and bottom flat surfaces engageable by the platen and bed-plate of a press and one of the said sections having a plurality of similar holes extending from its said flat surface to the respective mold recesses, and a plurality of similar core pins shaped at their inner ends to determine the interior contours of the articles to be molded and adapted to be initially positioned in the respective holes with their outer ends initially projecting beyond the flat surface of the corresponding mold section so as to be engaged and longitudinally moved into the respective mold recesses when pressure is applied by the press.

7. A mold as set forth in claim 6, wherein the core pins are threaded at their inner ends to provide molded articles with threaded interior contours.

8. In a mold for a plurality of similar articles having openings therein, the combination of two separable mold sections serving when in operative relationship to provide a plurality of mold recesses adapted to determine the exterior contours of the articles to be molded, one of the said sections having a plurality of similar holes extending from its outer face to the respective mold recesses, a plurality of similar core pins positioned in the respective holes and adapted to extend into the respective mold recesses and determine the interior contours of the articles to be molded, and an auxiliary plate having pins projecting therefrom and spaced to respectively engage the said core pins to move them longitudinally in the said holes.

9. In a mold for a plurality of similar interiorly threaded articles, the combination of two separable mold sections serving when in operative relationship to provide a plurality of mold recesses adapted to determine the exterior contours of the articles to be molded, one of the said sections having a plurality of similar holes extending from its outer face to the respective mold recesses, a plurality of similar exteriorly threaded core pins adapted to be initially positioned in the respective holes but outside of the mold recesses, the said core pins being longitudinally movable into the respective mold recesses and when in position therein determining the interior contours of the articles to be molded, and an auxiliary plate having pins projecting therefrom and spaced to respectively engage the said longitudinally movable core pins to move them additionally so as to eject the completed molded articles from the mold recesses when the mold sections have been separated.

10. A mold as set forth in claim 8 characterized by the provision on the said auxiliary plate of means additional to the said pins thereon for separating the two mold sections substantially simultaneously with additional longitudinal movement of the threaded core pins.

11. A mold as set forth in claim 8 wherein the mold section carrying the threaded core pins and the said auxiliary plate are relatively reversible so that the pins on the auxiliary plate may again engage the core pins to return them longitudinally to their said initial positions.

12. As an article of manufacture, an auxiliary plate for use with a mold comprising two separable sections of which one has a plurality of similar holes extending from its outer face, the said plate being provided with pins projecting therefrom and spaced to respectively enter the holes in the mold section to effect the longitudinal movement of core pins located in the said holes and being also provided with means additional to the said pins for separating the two sections of the mold substantially simultaneously with the movement of the said core pins.

In testimony whereof we have hereunto set our hands this 1st day of March, 1929.

BENJAMIN F. CONNER.
WILLIAM F. SCHMALZ.